US005942072A

United States Patent [19]

McKinnon

[11] Patent Number: 5,942,072

[45] Date of Patent: Aug. 24, 1999

[54] PROCESS OF MAKING A DECORATIVE RESILIENT FLOOR COVERING

[76] Inventor: Gordon McKinnon, 190 Blanca Ave., Tampa, Fla. 33606

[21] Appl. No.: 08/840,708

[22] Filed: Apr. 25, 1997

[51] Int. Cl.[6] .............................. B32B 31/12; B05D 1/38

[52] U.S. Cl. .......................... 156/247; 156/278; 156/279; 427/203; 427/258; 427/260; 427/267; 427/272; 427/407.1; 427/408; 52/315

[58] Field of Search .................................... 156/247, 278, 156/279, 280, 281; 427/202, 203, 258, 259, 262, 263, 264, 265, 267, 282, 272, 277, 278, 407.1, 408; 52/311.1, 314, 315

[56] References Cited

U.S. PATENT DOCUMENTS

| | | | |
|---|---|---|---|
| 3,239,364 | 3/1966 | Carlisle et al. . | |
| 3,350,483 | 10/1967 | Erb et al. . | |
| 3,542,250 | 11/1970 | McRitchie . | |
| 3,560,315 | 2/1971 | Evans et al. . | |
| 3,778,291 | 12/1973 | Elliott et al. . | |
| 3,908,043 | 9/1975 | Evans et al. | 427/203 |
| 4,212,691 | 7/1980 | Potosky et al. | 427/203 X |
| 4,584,209 | 4/1986 | Harrison | 427/202 X |
| 4,675,234 | 6/1987 | Sachs et al. . | |
| 4,721,634 | 1/1988 | McKinnon | 427/263 |
| 4,761,306 | 8/1988 | Clark et al. | 156/279 X |
| 4,855,165 | 8/1989 | Bolgiano et al. . | |
| 4,879,143 | 11/1989 | Rang | 427/407.1 X |
| 4,882,205 | 11/1989 | Valenduc | 427/203 X |
| 4,959,250 | 9/1990 | McKinnon | 427/263 X |
| 4,975,303 | 12/1990 | McKinnon | 427/263 |
| 5,059,471 | 10/1991 | McNally et al. . | |
| 5,069,939 | 12/1991 | McKinnon | 427/262 |
| 5,169,686 | 12/1992 | McKinnon | 427/263 |
| 5,405,674 | 4/1995 | Wang et al. . | |
| 5,447,752 | 9/1995 | Cobb | 427/272 X |
| 5,460,855 | 10/1995 | Andersson . | |
| 5,502,941 | 4/1996 | Zember et al. | 52/314 |
| 5,520,956 | 5/1996 | Kieser et al. | 427/203 |
| 5,571,588 | 11/1996 | Lussi et al. | 427/203 X |
| 5,667,892 | 9/1997 | Marillier . | |
| 5,735,094 | 4/1998 | Zember | 52/314 |

*Primary Examiner*—Curtis Mayes
*Attorney, Agent, or Firm*—Frijouf, Rust & Pyle, P.A.

[57] ABSTRACT

A process of making a decorative resilient floor covering is disclosed comprising the steps of applying a first layer of a first curable polymeric material to a substrate. A tape is applied to selected regions of the first layer of the first curable polymeric material after the curing thereof. A second layer of a second curable polymeric material is applied to the cured first layer. A pigmented particulate material is applied to one of the first and second layers prior to the curing thereof. The tape is removed to reveal the first layer and the second layer with the pigmented particulate material.

13 Claims, 10 Drawing Sheets

PROCESS OF MAKING A DECORATIVE RESILIENT FLOOR COVERING

BACKGROUND OF THE INVENTION

Field Of The Invention

This invention relates to floor coverings and more particularly to an improved process of making a decorative resilient floor covering.

Background Of The Invention

Various types of material have been used for floor coverings throughout the ages. Among the most timeless floor coverings have been marble, granite or stone floor coverings. Although these types of floor coverings are very durable, the cost of these materials is considerable. Furthermore, the cost of installing the marble, granite or stone floors is also a significant cost consideration.

In an effort to reduce the cost of such durable floor materials, synthetic tiles were fabricated for providing a durable floor material. Synthetic tiles were manufactured by a refractory process of common low cost materials. In addition, synthetic tiles provided an opportunity for coloring the tiles to a desired color during the refractory process. Although the ceramic tiles have reduced the material costs relative to marble, granite or stone floor coverings, the cost of installing synthetic tiles is still a costly process.

An additional disadvantage of all of the aforementioned floor materials was the possibility of damaging the marble, granite, stone or synthetic tile floor material. Although these materials provided a durable flooring surface, these may be cracked or chipped if a heavy metallic object was dropped onto the flooring material. In such a case, the repair of the floor generally required the removal of the chipped or cracked portion and the insertion of a new flooring material. This was a very difficult task in some situations since it is difficult to match the color and texture of original the marble, granite, stone or synthetic tile floor material.

A further disadvantage of the aforementioned floor materials is the hardness of the floor material. Although these floorings provided a very durable flooring material, the material is very hard and thereby very fatiguing to a person walking on the floor covering for a long period of time.

To overcome some of these difficulties, I proposed the processes of making synthetic stone, marble and tile through the use of a process using a thin cementitious layer. U.S. Pat. No. 5,169,686 discloses a method for an improved process for coating a substrate with a marbleized polyester coating. The substrate is prepared for adherence by a polyester material. The substrate is coated with a first colored polyester material. A second colored polyester material is deposited onto selected areas of the first colored polyester material prior to the curing of the first colored polyester material. The first and second uncured polyester materials are reciprocally rolled with a fibrous roller to blend the second colored polyester material into the first colored polyester material to produce the marbleized polyester coating.

U.S. Pat. No. 4,959,250 discloses a process for covering a substrate with a textured simulated marble surface and the resulting product. In the process, cement and sand are mixed to form a first mixture to which is added an aqueous solution of an adhesive resin such as an acrylic resin to create a first mortar. The cement and sand are mixed to form a second mixture to which is added an aqueous solution of an adhesive resin such as an acrylic resin to create a second mortar. A contrasting pigment is added to one of the first and second mortars or to each of the mortars. The first mortar is applied over the entire substrate. The second mortar is applied onto randomly spaced portions over the previously applied first mortar prior to the complete curing of the first mortar to form a unitary textured covering. The textured unitary coating includes a lower layer and an upper layer with the upper layer comprising the second mortar and the lower layer comprising the first and second mortar. The contrasting pigment in the one of the first and second mortars is allowed to commingle with the other of the first and second mortars to enable the pigmented areas to blend with other pigmented areas, if present, and with the non-pigmented areas. Substantially only the blended upper layer of the unitary textured covering of the substrate is lightly troweled to simulate a marble surface.

U.S. Pat. No. 5,069,939 discloses a process for covering a substrate with a cementitious simulated ceramic surface having a mottled, speckled appearance. Cement and sand are mixed with an aqueous solution of an adhesive resin to create a viscous liquid mortar. The viscous liquid mortar is applied onto randomly spaced portions of the cementitious substrate to create a noncontiguous thickened cementitious coating having a high viscosity to prevent spreading of the liquid mortar over the cementitious substrate. The noncontiguous thickened cementitious coating is troweled to form a plurality of interconnecting and non-interconnecting flattened and level plateaus partially covering the cementitious substrate to reveal a simulated mottled, speckled ceramic covering.

U.S. Pat. No. 4,721,634 discloses a process for covering a substrate with a textured simulated marble surface by mixing cement and sand to form a first mixture to which is added an aqueous solution of acrylic resin to create a first mortar. The cement and sand are mixed to form a second mixture to which is added an aqueous solution of acrylic resin to create a second mortar. A contrasting pigment is added to one of the first and second mortars. The first mortar is applied over the entire substrate. The second mortar is applied onto randomly spaced portions over the previously applied first mortar prior to the complete curing of the first mortar to form a unitary textured covering. The textured unitary coating includes a lower layer and an upper layer with the upper layer comprising the second mortar and the lower layer comprising the first and second mortar. The contrasting pigment in the one of the first and second mortars is allowed to commingle with the other of the first and second mortars to enable the pigmented areas to blend with the non-pigmented areas. Lightly troweling substantially only the blended upper layer of the unitary textured covering of the substrate to simulate a marble surface.

U.S. Pat. No. 4,975,303 discloses a process for covering a substrate with a textured simulated marble surface and the resulting product. Cement and sand are mixed to form a first mixture to which is added an aqueous solution of an adhesive resin such as an acrylic resin to create a mortar. The mortar is spread on the substrate and one or more color pigments are added to the surface at randomly-spaced locations prior to the complete curing of the mortar. Air is blown onto the surface of the mortar and serves to blend the color pigments into the mortar and into each other. As the air stream moves across the surface of the mortar, color patterns are formed.

My prior inventions set forth in the above U.S. Patents have solved the need for providing a low cost, durable floor covering material which has the attractive benefits of marble, granite, nature stone or tile without the expense association with the cost of materials and cost of installation. Furthermore, when the aforementioned flooring materials were applied to a wooden floor or other resilient floor, the thin, cementitious coating had sufficient flexibility to provide a resilient floor covering as to not fatigue a person walking on the floor for a prolonged period of time. In cases where my floor covering was applied to a hard surface such as a concrete slab or the like, my floor covering did not provide the desired resiliency due to the nature and properties of the substrate.

Some in the prior art have proposed the use of a resilient material such as a resilient polymeric material for providing a floor covering. Although many of these materials are durable and provide the desired resiliency to the floor covering, these floor materials are singularly in color and did not provide an attractive floor covering as my synthetic cementitious floor covering set forth above. These resilient floor coverings are also economic both in material cost and labor for installation.

Accordingly, it is an object of the present invention to provide a process of making a decorative resilient floor covering having the appearance of a nature stone or a ceramic tile.

Another object of this invention is to provide a process of making a decorative resilient floor covering which may be made in multiple tile colors and multiple grout colors.

Another object of this invention is to provide a process of making a decorative resilient floor covering which provides multiple colors of natural stone and multiple colors of stone grout.

Another object of this invention is to provide a process of making a decorative resilient floor covering which has the advantages of a natural stone or marble appearance while being resilient and comfortable for walking on for prolonged periods of time.

Another object of this invention is to provide a process of making a decorative resilient floor covering which may be installed by a semi-skilled worker.

Another object of this invention is to provide a process of making a decorative resilient floor covering wherein a second flooring layer may be applied to the upper surface thereto in the event the first flooring is deteriorated or in the event that a color change is desired.

Another object of this invention is to provide a process of making a decorative resilient floor covering which may be adaptable to a wide variety of colors.

Another object of this invention is to provide a process of making a decorative resilient floor covering which may be achieved through the use of a conventional paint roller.

Another object of this invention is to provide a process of making a decorative resilient floor covering without a substantial increase in the cost in the coating process.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying figures.

SUMMARY OF THE INVENTION

The present invention is defined by the appended claims with specific embodiments being shown in the attached figures. For the purpose of summarizing the invention, the invention relates to an improved process of making a decorative resilient floor covering comprising the steps of applying a first layer of a first curable polymeric material to a substrate. A tape material is applied to selected regions of the first layer of the first curable polymeric material after the curing thereof. A second layer of a second curable polymeric material is applied to the cured first layer. A pigmented particulate material is applied to one of the first and second layers prior to the curing thereof. The tape material is removed to reveal the first layer and the second layer with the pigmented particulate material.

In a more specific embodiment of the invention, the process comprises applying a first layer of a first curable polymeric material to a substrate. A first pigmented particulate material is applied to the first layer of the first curable polymeric material prior to the curing thereof with the first pigmented particulate material having a first color. A tape material is applied to selected regions of the first layer of the first curable polymeric material after the curing thereof. A second layer of a second curable polymeric material is applied to the cured first layer. A second pigmented particulate material is applied to the second layer of the second curable polymeric material prior to the curing thereof with the second pigmented particulate material having a second color different than the first color of the first pigmented particulate material. The tape material is removed to reveal the first color of the first layer and the second color of the second layer.

Preferably, the substrate is a substantially rigid substrate or may be a moderately rigid substrate. Preferably, the substrate is prepared for adherence by the first curable polymeric material.

In one embodiment of the invention, the first curable polymeric material is a resilient polymeric material and may be applied by troweling the first curable polymeric material onto the substrate. Preferably, the first pigmented particulate material comprises paint chips of a first color that are sprayed onto the first layer with an air spray.

The tape material is applied to selected regions of the first layer of the first curable polymeric material which includes applying the tape mate rial to the first layer of the first curable polymeric material in a decorative pattern such as a decorative tile pattern or a decorative natural stone pattern.

The second layer of the second curable polymeric material may be applied to the cured first layer by rolling the second curable polymeric material onto the first layer by a roller. The second pigmented particulate material comprises paint chips of a second color and may be applied by spraying the second pigmented particulate material onto the second layer with an air spray. A third layer of a third curable polymeric material may be applied to the cured second layer and exposed cured first layer.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying Figures in which.

Similar reference characters refer to similar parts throughout the several Figures of the drawings.

DETAILED DISCUSSION

Figure 1:
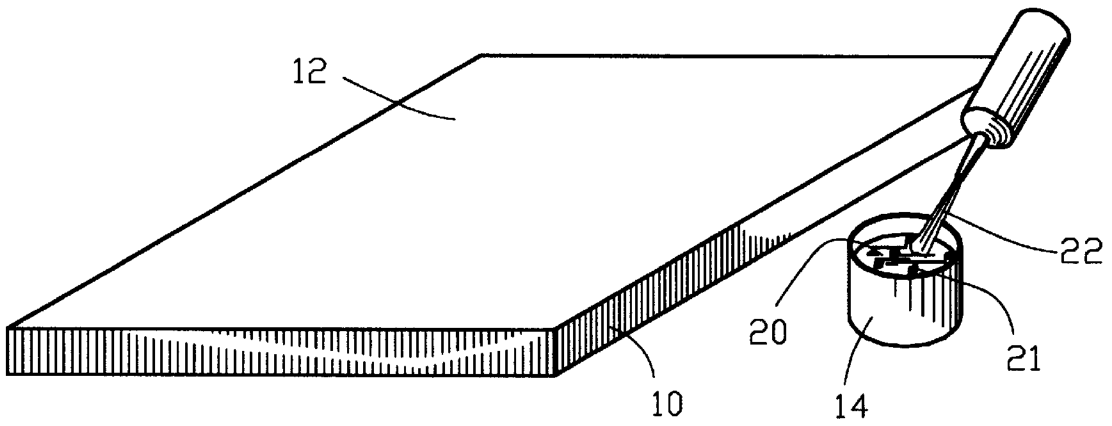
FIG. 1 is an isometric view of a substrate for receiving a decorative resilient floor covering of a first embodiment of the present invention.

FIG. 1 is an isometric view of a substrate 10 for receiving a decorative resilient floor covering of a first embodiment of the present invention. The substrate 10 may be a substantially rigid substrate such as concrete or the like or may be a semi-rigid substrate such as a wooden floor or the like. Preferably, the substrate 10 is substantially flat and free from major imperfections. However, the present invention is suitable for use with substrates having moderate imperfections including depressions, cracks and the like since the decorative resilient floor covering of the present invention covers such moderate imperfections as will be apparent hereinafter. Large imperfections and through holes are repaired by conventional means depending upon the specific type and material of the substrate.

The invention is incorporated into the decorative resilient floor covering and the process of making the decorative resilient floor covering. A preliminary step in the process of making the decorative resilient floor covering comprises the cleaning of a surface 12 of the substrate 10 by a cleaning process. The cleaning process includes cleaning the surface of the substrate 10 of any lose material such as paint, dirt and the like. Thereafter, foreign materials such as grease, oils, adhesives and the like are removed by suitable means such as washing or pressure washing or chemical agents depending upon the foreign materials present on the surface 12 of the substrate 10.

FIG. 1 also illustrates the mixing of a first curable polymeric material 20. In this example of the invention, the first curable polymeric material 20 comprises a main component 21 and a hardener component 22 for activating the curing of the main component 21 of the first curable polymeric material 20. The main component 21 and the hardener component 22 are mixed within a container 14 for enabling the first curable polymeric material 20 to cure into a resilient material within a period of several hours.

One example of the first curable polymeric material 20 which is suitable for use with the present invention is a product Aromatic Polyurethane sold under the trademark "RBC—Aromatic Basecoat" by Seamco Laboratories, Inc., of 119 South Oregon Avenue, Tampa, Fla. 33606 or any other equivalent curable polymeric material. The "RBC—Aromatic Basecoat" is a water activated curable polymeric material comprising a urethane main component and an aqueous hardener component.

Figure 2:
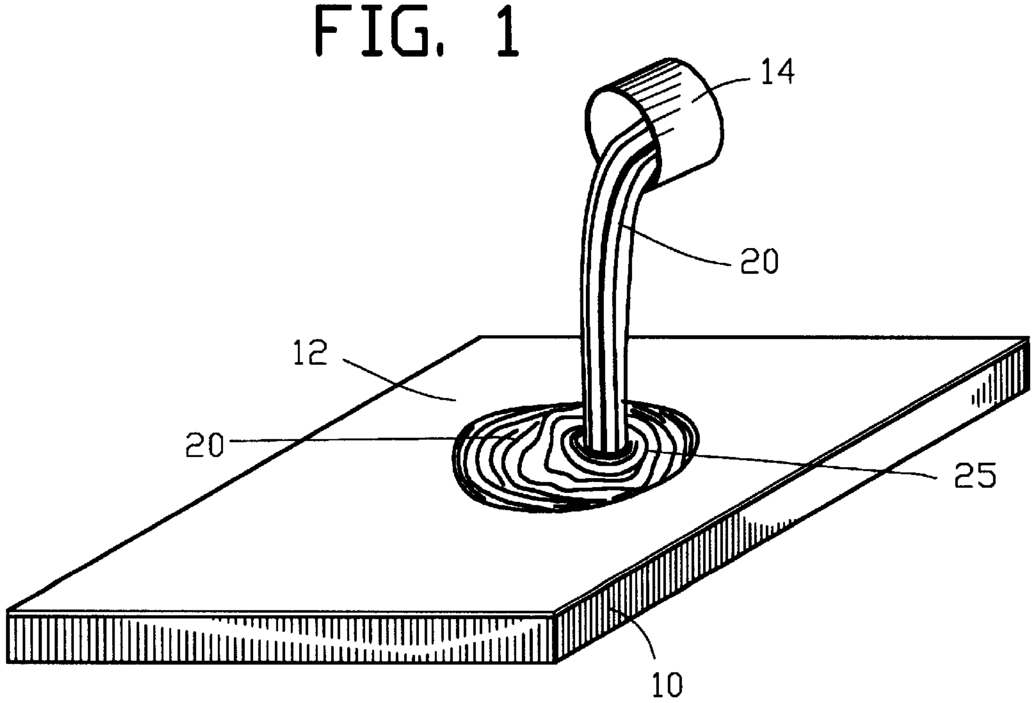
FIG. 2 is an isometric view illustrating the application of a first curable polymeric material to the substrate of FIG. 1.

FIG. 2 is an isometric view illustrating the application of a first layer 24 of the first curable polymeric material 20 to the surface 12 of the substrate 10. In this embodiment, the first curable polymeric material 20 is shown being poured onto the surface 12 of the substrate 10 and may be leveled by suitable means such as the use of a trowel or the like. The liquid character and viscosity of the first curable polymeric material 20 makes the first layer 24 self-leveling and aids in hiding or covering any moderate imperfections including depressions, cracks and the like in the substrate 10. In one example of the process, the first curable polymeric material 20 is poured or rolled onto the surface 12 of the substrate 10 and is leveled by a fine V-notch trowel to have a final thickness between 0.010 and 0.020 inches.

Figure 3:
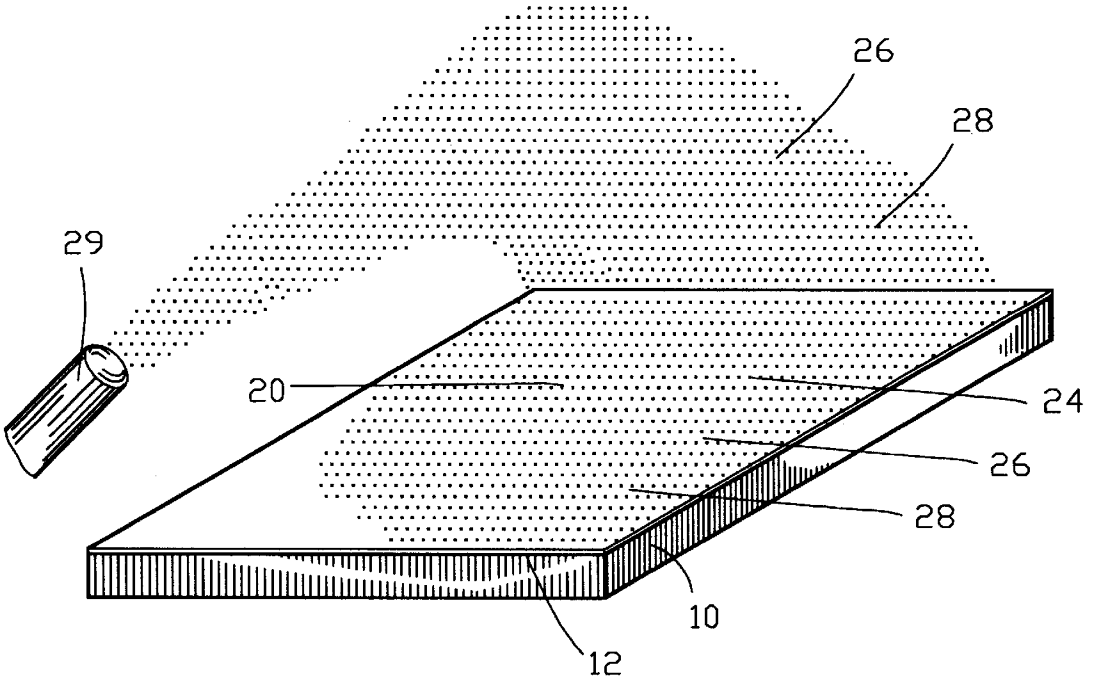
FIG. 3 is an isometric view illustrating the application of a first pigmented particulate material to the partially cured first layer of the first curable polymeric material.

FIG. 3 is an isometric view illustrating the application of a first pigmented particulate material 26 to the partially cured first layer 24 of the first curable polymeric material 20. Preferably, the first pigmented particulate material 26 comprises paint chips 28 of a first color. In one example of the invention, the first pigmented particulate material 26 comprises paint chips 28 of a first color.

Preferably, the first pigmented particulate material 26 is applied to the first layer 24 of the first curable polymeric material 20 by spraying the first paint chips 28 onto the first layer 24 with an air spray gun 29. In the alternative, a hopper gun normally used for applying ceiling material may be used for applying the first paint chips 28. As best shown in FIG. 3, the first paint chips 28 are sprayed upwardly to fall by action of gravity onto the first layer 24.

Figure 4:
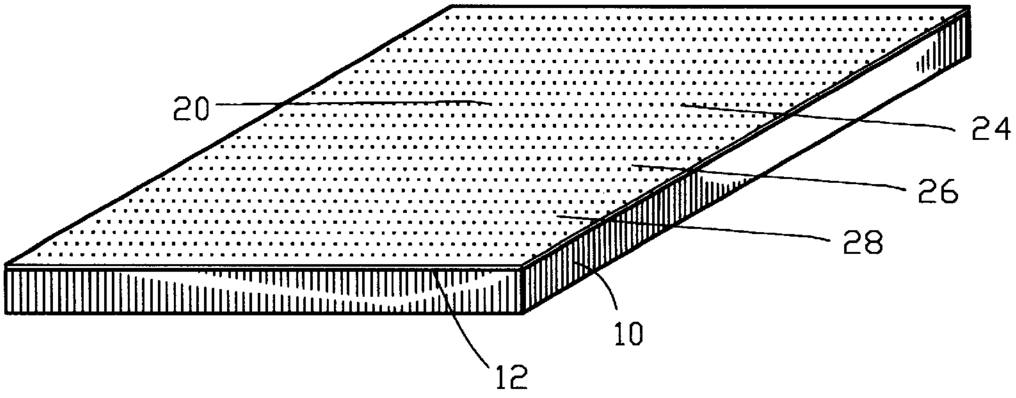
FIG. 4 is an isometric view illustrating the completion of the application of the first pigmented particulate material to the first layer of the first curable polymeric material.

FIG. 4 is an isometric view illustrating the completion of the application of the first pigmented particulate material 26 to the first layer 24 of the first curable polymeric material 20. The first pigmented particulate material 26 may be uniformly distributed about the surface of the first layer 24 or may be selectively distributed about the surface of the first layer 24 for aiding in the decorative appearance of the decorative resilient floor covering.

After the first layer 24 of the first curable polymeric material 20 is fully cured, any excess first pigmented particulate material 26 that is not bonded to the first layer 24 of the first curable polymeric material 20 is removed by sweeping or vacuuming the surface of the first layer 24. Typically, the first curable polymeric material 20 is fully cured in a period of four hours.

Figure 5:
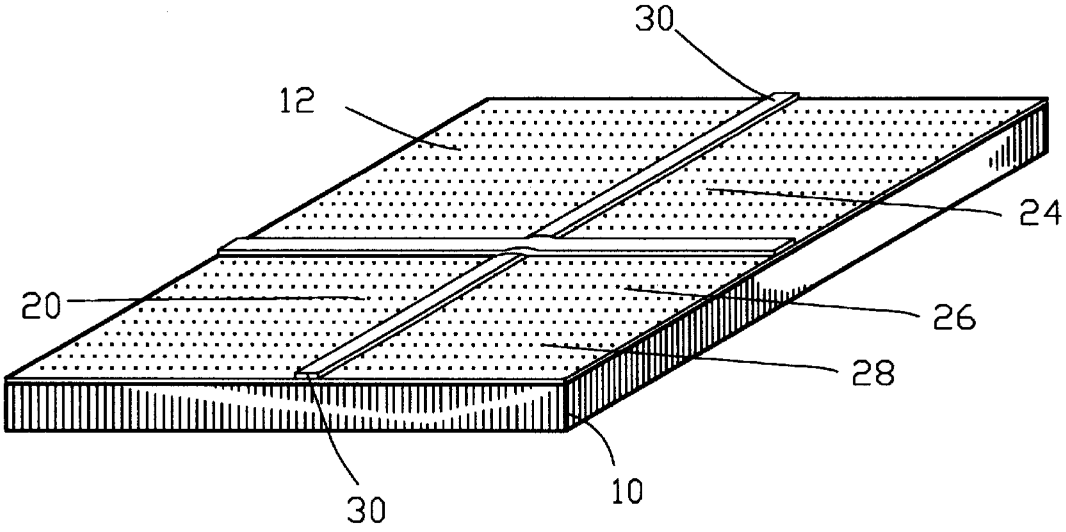
FIG. 5 illustrates the application of a tape material to an upper surface of the first layer of the first curable polymeric material.

FIG. 5 illustrates the application of a tape material 30 to an upper surface of the first layer 24 after the curing of the first curable polymeric material 20. The tape material 30 may be any suitable tape such as paint masking tape of the like. The tape material 30 is applied to selected regions of the first layer 24 of the first curable polymeric material 20 to provide a decorative pattern. In this embodiment, the tape material 30 is applied to the first layer 24 to provide a decorative tile pattern. However, it should be appreciated by those skilled in the art that the tape material 30 may be applied to the first layer 24 to provide a decorative pattern of tile, natural stone, marble,granite,brick or any other suitable pattern.

Figure 6:
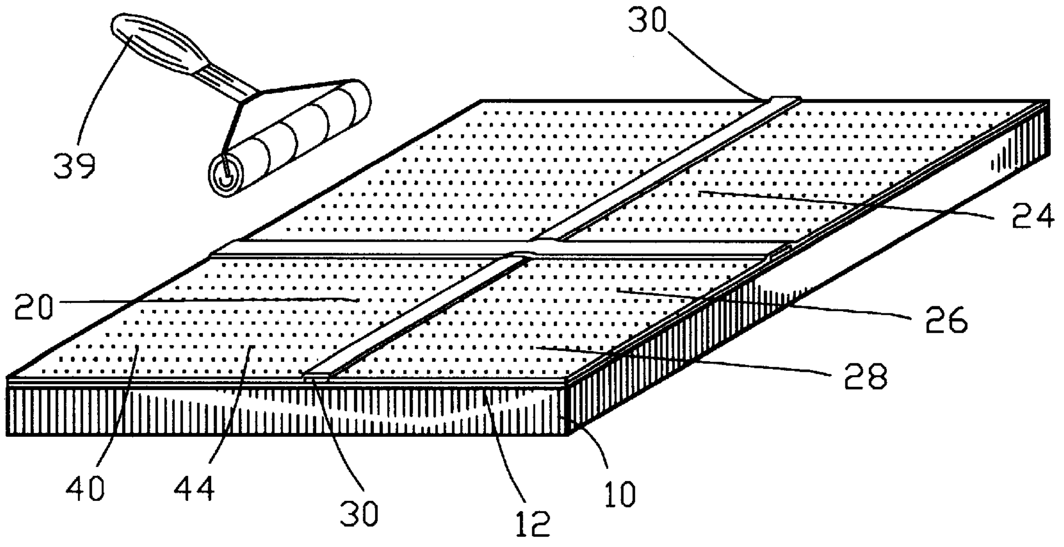
FIG. 6 is an isometric view illustrating the application of a second layer of a second curable polymeric material to the first layer.

FIG. 6 is an isometric view illustrating the application of a second curable polymeric material 40 to the first layer 24 to form a second layer 44 of the second curable polymeric material 40. One example of the second curable polymeric material 40 which is suitable for use with the present invention is a clear polymeric material such as a water base, one-part, clear, acrylic polymeric material. In this embodiment, the second curable polymeric material 40 is shown being rolled onto the first layer 24 through the use of a conventional paint roller 39. In one example of the process, the second curable polymeric material 40 is rolled onto the first layer 24 to have a final thickness between 0.005 and 0.010 inches.

Figure 7:
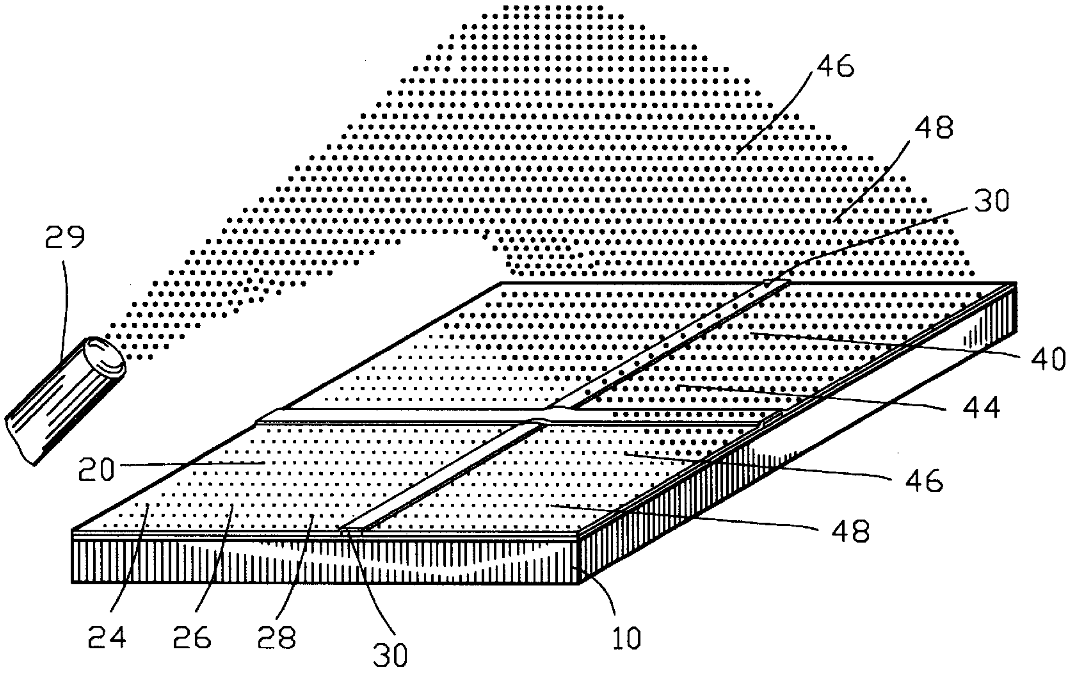
FIG. 7 is an isometric view illustrating the application of a second pigmented particulate material to the partially cured second layer of the second curable polymeric material.

FIG. 7 is an isometric view illustrating the application of a second pigmented particulate material 46 to the partially cured second layer 44 of the second curable polymeric material 40. Preferably, the second pigmented particulate material 46 comprises paint chips 48 of a second color. In one example of the invention, the second pigmented particulate material 46 comprises paint chips 48 of a second color. In this example of the invention, the second pigmented particulate material 46 is applied to the second layer 44 of the second curable polymeric material 40 by spraying the second paint chips 48 onto the second layer 44 with the air spray gun 29 or a hopper gun (not shown). As best shown in FIG. 7, the second paint chips 48 are sprayed upwardly to fall by action of gravity onto the second layer 44.

The second color of the second pigmented particulate material 46 is different than the first color of the first pigmented particulate material 26. Preferably, the second color of the second pigmented particulate material 46 is selected to contrast the first color of the first pigmented particulate material 26.

Figure 8:
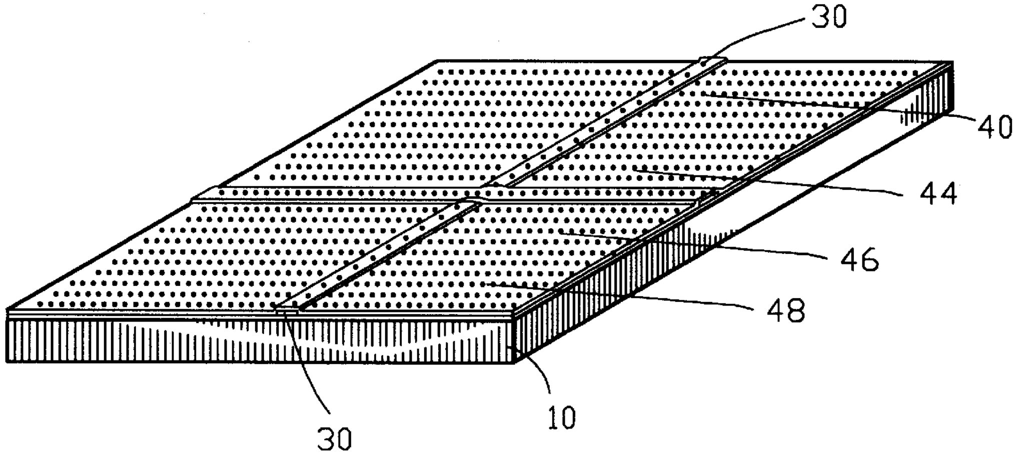
FIG. 8 is an isometric view illustrating the completion of the application of the second pigmented particulate material to the second layer of the second curable polymeric material.

FIG. 8 is an isometric view illustrating the completion of the application of the second pigmented particulate material 46 to the second layer 44 of the second curable polymeric material 40. The second pigmented particulate material 46 may be uniformly distributed about the surface of the second layer 44 or may be selectively distributed about the surface of the second layer 44 for aiding in the decorative appearance of the decorative resilient floor covering.

After the second layer 44 of the second curable polymeric material 40 is fully cured, any excess second pigmented particulate material 46 that is not bonded to the second layer 44 of the second curable polymeric material 40 is removed by sweeping or vacuuming the surface of the second layer 44. Typically, the second curable polymeric material 40 is fully cured in a period of one hour.

Figure 9:
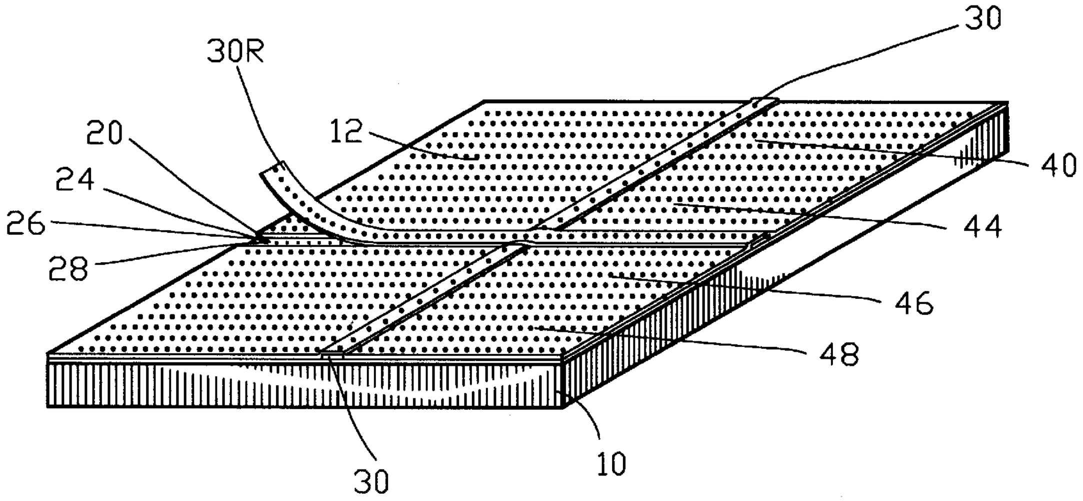
FIG. 9 illustrates the removal of the tape material.

FIG. 9 illustrates the removal of the tape material 30 from the first and second layers 24 and 44. The tape material 30 is peeled off of the first and second layers 24 and 44 as shown by tape portion 30R after curing of the complete curing of the first layer 24 of the first curable polymeric material 20 but prior to the complete curing of the second layer 44 of the second curable polymeric material 40.

After the removal of the tape material 30, the first color of the first layer 24 is revealed to contrast the second color of the second layer 44. Furthermore, the removal of the tape material 30 provides indentations 50 in the second layer 44 for simulating the indentations of grout of a decorative pattern of tile, natural stone, marble, granite, brick or any other suitable pattern.

Figure 10:
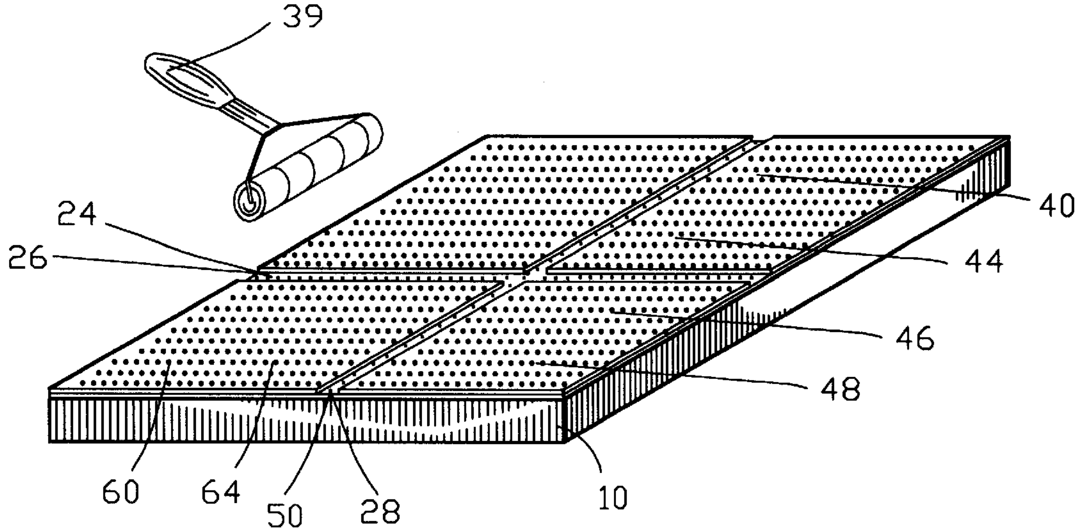
FIG. 10 is an isometric view illustrating the application of a third layer of a third curable polymeric material to the second layer.

FIG. 10 is an isometric view illustrating the application of a third curable polymeric material 60 to the second layer 44 to form a third layer 64 of the third curable polymeric material 60. One example of the third curable polymeric material 64 which is suitable for use with the present invention is a clear polymeric material such as a two part polyurethane material.

In this embodiment, the third curable polymeric material 60 is shown being rolled onto the exposed first layer 24 and the second layer 44 through the use of a conventional paint roller 39. In one example of the process, the third curable polymeric material 60 is rolled onto the exposed first layer 24 and the second layer 44 to have a thickness between 0.005 and 0.010 inches. Preferably, two coats of the third curable polymeric material 60 are applied to the exposed first layer 24 and the second layer 44. The third layer 64 of the third curable polymeric material 60 acts as a sealer for the decorative resilient floor covering of the present invention.

Figure 11:
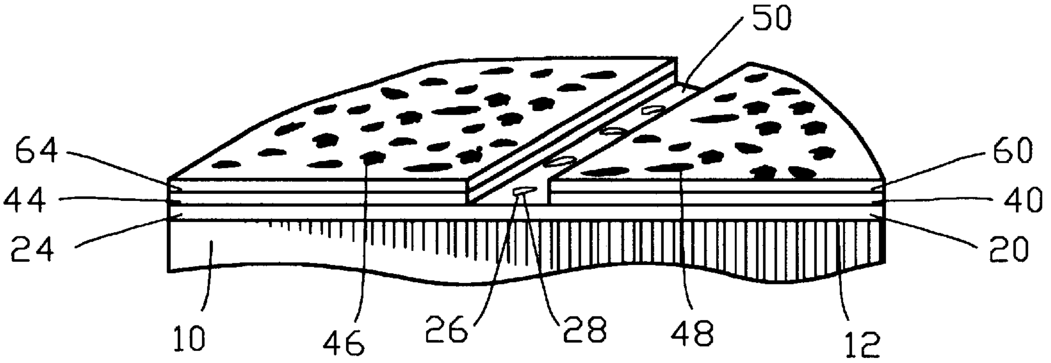
FIG. 11 is an enlarged view of a portion of FIG. 10.

FIG. 11 is an enlarged view of a portion of FIG. 10 further showing the first, second and third layers 24, 44 and 64 of the present invention. It should be appreciated that the third layer 64 extends across the indentation 50 but has been deleted from the indentation 50 for proposes of clarity. The first pigmented particulate material 26 is disposed within the indentation 50 to contrast the second pigmented particulate material 46 disposed in the second layer 44.

Figure 12:
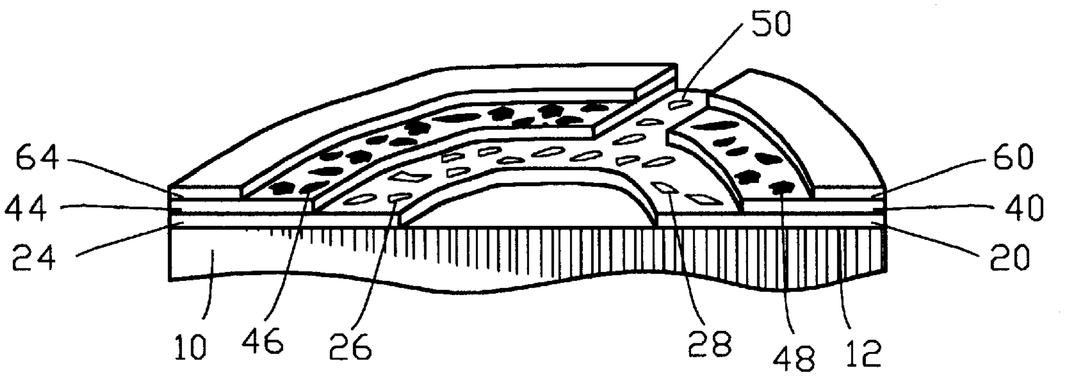
FIG. 12 is a cut away view of FIG. 11.

FIG. 12 illustrates a cut away view of FIG. 11 illustrating the first layer 24 containing the first pigmented particulate material 26 shown as first paint chips 28 whereas the second layer 44 contains the second pigmented particulate material 46 shown as second paint chips 48. The first paint chips 28 are shown as a light color whereas the second paint chips 48 are shown as a dark color. The light color of the first paint chips 28 contrasts to the dark color of the second paint chips 48. It should be appreciated that the first paint chips 28 may be any color to contrast the color of the second paint chips 48.

Figure 13:
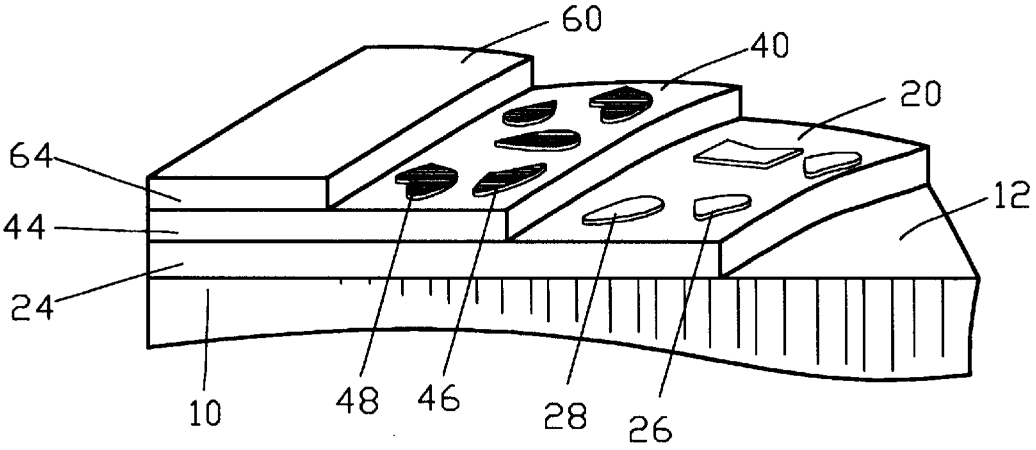
FIG. 13 is an enlargement of a portion of FIG. 12.

FIG. 13 is a further enlargement of a portion of FIG. 12 illustrating the first and second paint chips 28 and 48. Preferably, the first paint chips 28 and the second paint chips 48 have a flake configuration. In a specific example of the invention, the first pigmented particulate material 26 comprises paint chips 28 in the configuration of flakes having a longitudinal and transverse dimension of 0.05 to 0.25 inches and having a thickness between 0.003 to 0.007 inches. In a similar manner, the second pigmented particulate material 46 comprises paint chips 48 in the configuration of flakes having a longitudinal and transverse dimension of 0.05 to 0.25 inches and having a thickness between 0.003 to 0.007 inches.

The first and second paint chips 28 and 48 normally rest on a longitudinal side as shown in FIG. 13. The first paint chips 28 having a thickness between 0.003 to 0.007 inches will be totally or partially contained within the first layer 24 having a thickness between 0.010 and 0.020 inches. The second paint chips 48 having a thickness between 0.003 to 0.007 inches will be contained within the second layer 44 having a thickness between 0.005 and 0.010 inches. The second paint chips 48 may extend slightly above the second layer 44 to add to the decorativeness of the decorative resilient floor covering. The third layer 64 covers the second paint chips 48 to have a thickness between 0.005 and 0.010 inches.

Figure 14:
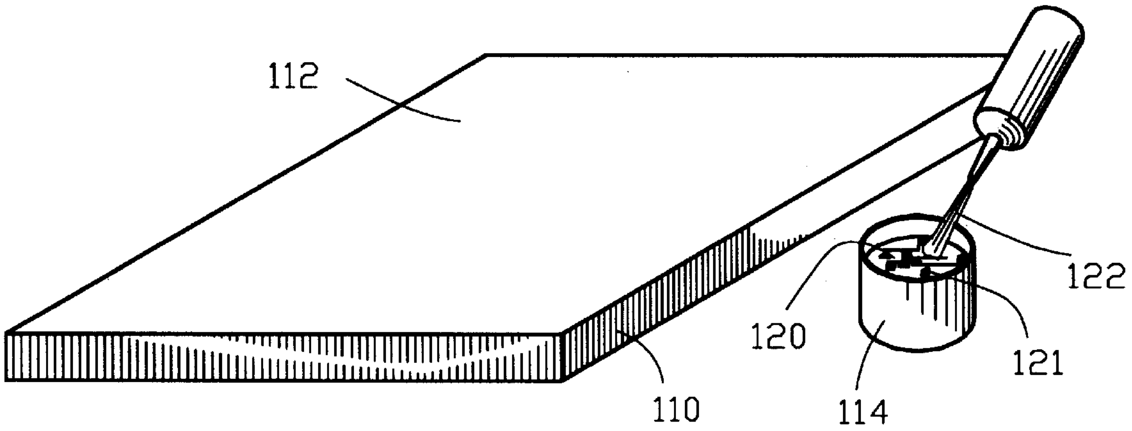
FIG. 14 is an isometric view of a substrate for receiving a decorative resilient floor covering of a second embodiment of the present invention.

FIG. 14 is an isometric view of a substrate 110 for receiving a decorative resilient floor covering of a second embodiment of the present invention. In a similar manner as the first embodiment of the invention, a preliminary step in the process of making the decorative resilient floor covering comprises the cleaning of a surface 112 of the substrate 110 by a cleaning process.

FIG. 14 illustrates the mixing of a first curable polymeric material 120 comprising a main component 121 and a hardener component 122 for activating the curing of the main component 121 of the first curable polymeric material 120. A first pigmented particulate material 126 may be mixed into the first curable polymeric material 120. Preferably, the first pigmented particulate material 126 comprises paint chips 128 of a first color.

Figure 15:
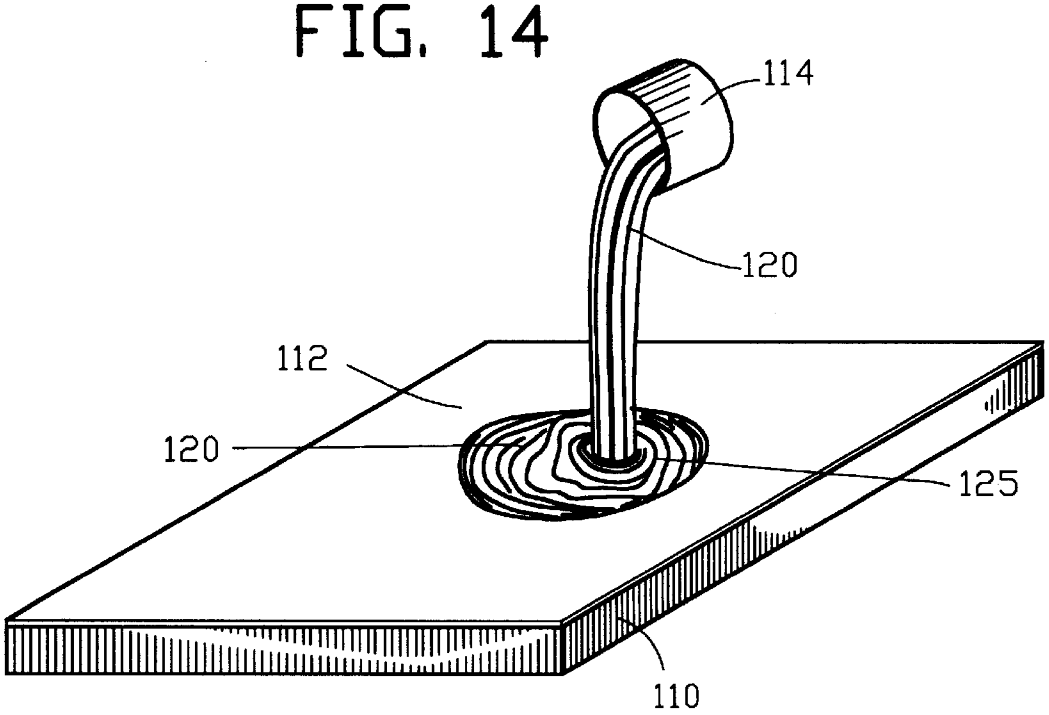
FIG. 15 is an isometric view illustrating the application of a first curable polymeric material to the substrate of FIG. 15.

FIG. 15 is an isometric view illustrating the application of a first layer 124 of the first curable polymeric material 120 and the first pigmented particulate material 126 to the surface 112 of the substrate 110. In this embodiment, the first curable polymeric material 120 and the first pigmented particulate material 126 is shown being poured onto the surface 112 of the substrate 110 and may be leveled by suitable means such as the use of a trowel or the like.

Figure 16:
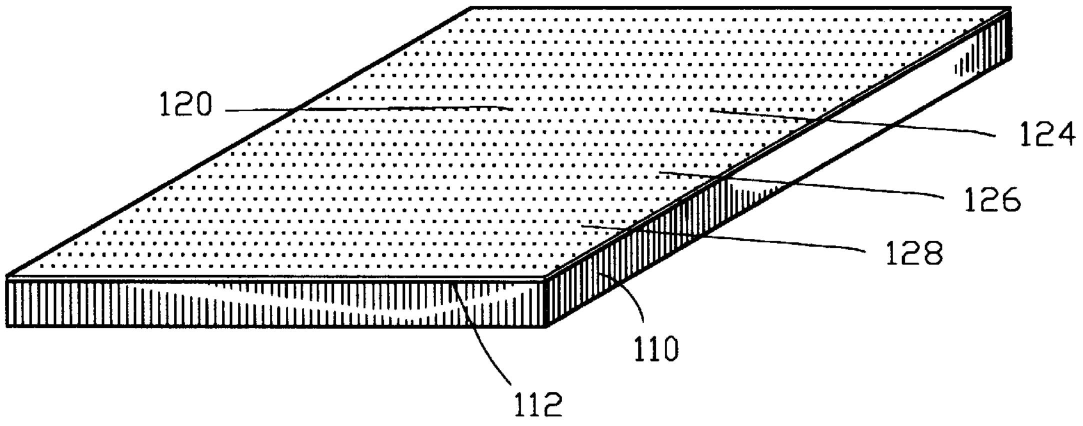
FIG. 16 is an isometric view illustrating the completion of the application of the first layer of the first curable polymeric material.

FIG. 16 is an isometric view illustrating the completion of the application of the first curable polymeric material 120 and the first pigmented particulate material 126 to the first layer 124 of the first curable polymeric material 120.

Figure 17:
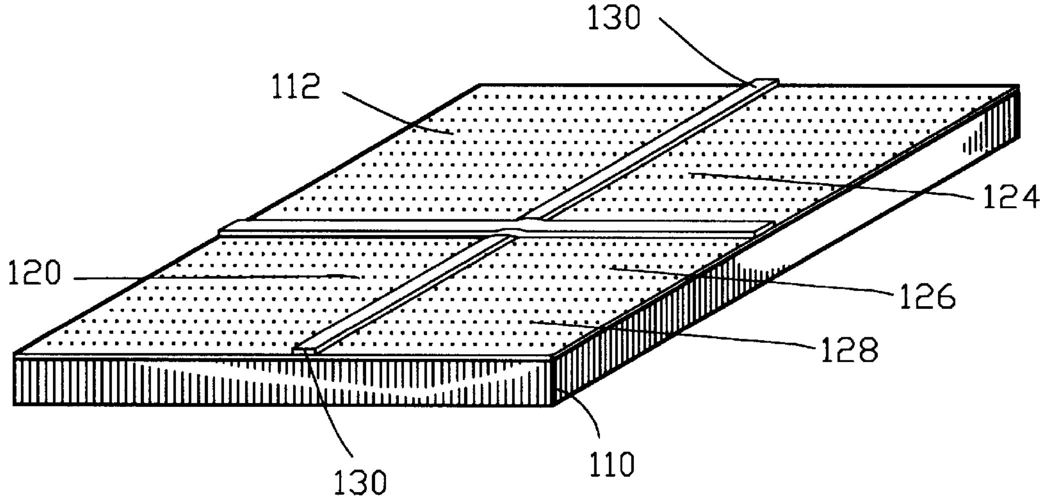
FIG. 17 illustrates the application of a tape material to an upper surface of the first layer of the first curable polymeric material.

FIG. 17 illustrates the application of a tape material 130 to an upper surface of the first layer 124 after the curing of the first curable polymeric material 120. The tape material 130 may be any suitable tape such as paint masking tape of the like. The tape material 130 is applied to selected regions of the first layer 124 of the first curable polymeric material 120 to provide a decorative pattern.

Figure 18:
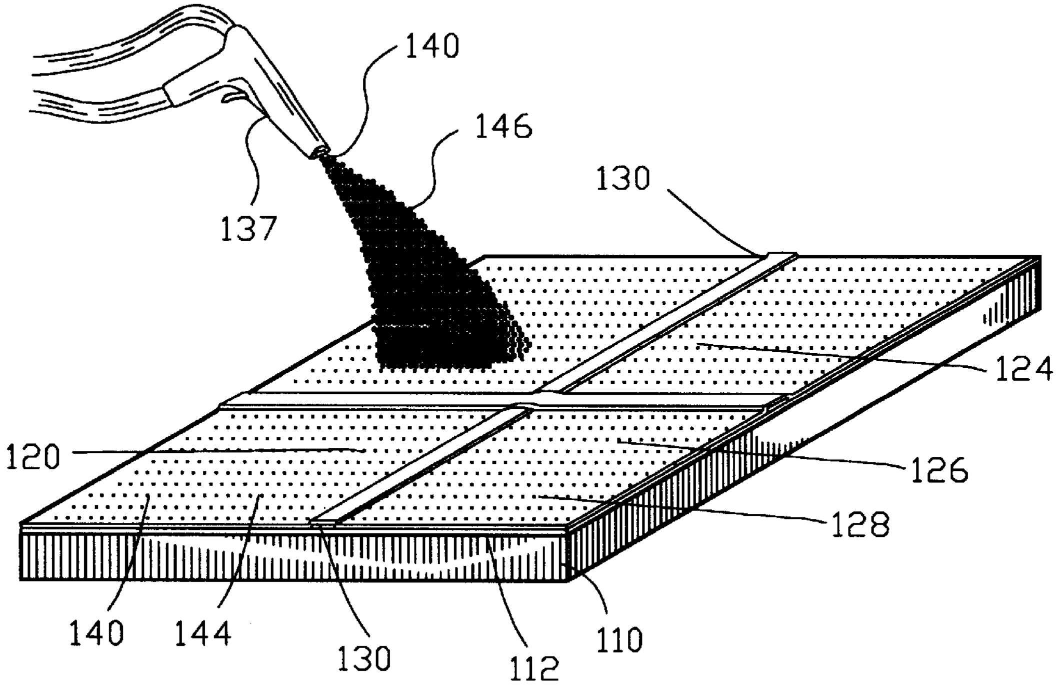
FIG. 18 is an isometric view illustrating the application of a second layer of a second curable polymeric material and a second pigmented particulate material to the first layer.

FIG. 18 is an isometric view illustrating the application of a second curable polymeric material 140 and a second pigmented particulate material 146 to the first layer 124 to form a second layer 144 of the second curable polymeric material 140. One example of the second curable polymeric material 140 which is suitable for use with the present invention is a clear polymeric material such as a water base, one-part, clear, acrylic polymeric material. In this embodiment, the second curable polymeric material 140 and the second pigmented particulate material 146 is shown being sprayed onto the first layer 24 through the use of a spray gun 137.

Preferably, the second pigmented particulate material 146 comprises paint chips 148 of a second color. The second color of the second pigmented particulate material 146 is different than the first color of the first pigmented particulate material 126. Preferably, the second color of the second pigmented particulate material 146 is selected to contrast the first color of the first pigmented particulate material 126.

Figure 19:
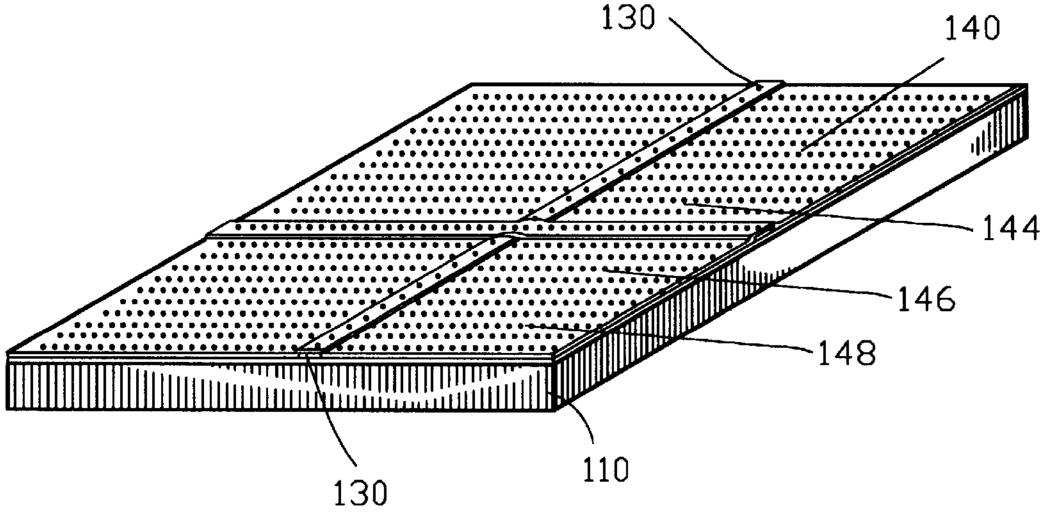
FIG. 19 is an isometric view illustrating the completion of the application of the second layer of the second curable polymeric material.

FIG. 19 is an isometric view illustrating the completion of the application of the second pigmented particulate material 46 and the second pigmented particulate material 146 to the second layer 144 of the second curable polymeric material 140. The second pigmented particulate material 146 may be uniformly distributed about the surface of the second layer 144 or may be selectively distributed about the surface of the second layer 144 for aiding in the decorative appearance of the decorative resilient floor covering.

Figure 20:
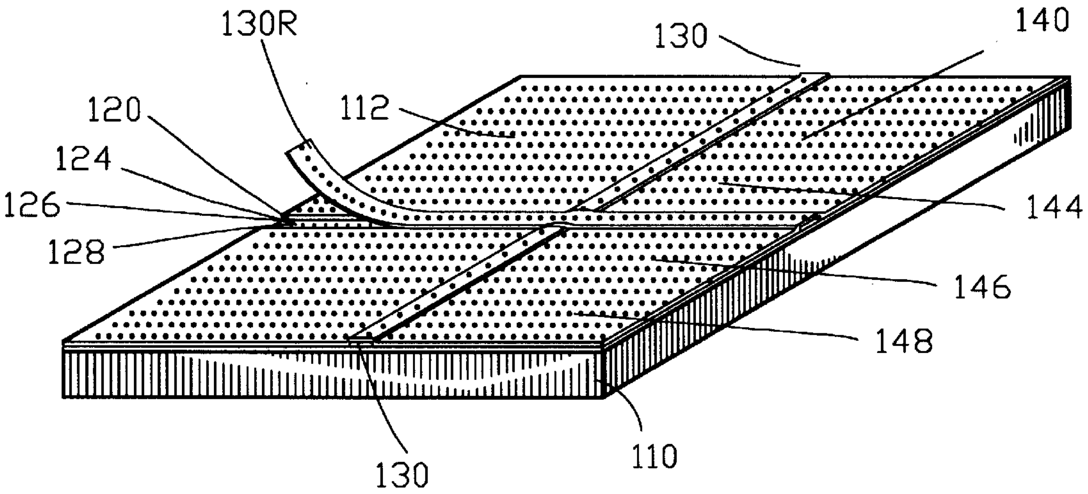
FIG. 20 illustrates the removal of the tape material.

FIG. 20 illustrates the removal of the tape material 130 from the first and second layers 124 and 144. The tape material 130 is peeled off of the first and second layers 124 and 144 as shown by tape portion 130R after curing of the complete curing of the first layer 124 of the first curable polymeric material 120 but prior to the complete curing of the second layer 144 of the second curable polymeric material 140.

After the removal of the tape material 130, the first color of the first layer 124 is revealed to contrast the second color of the second layer 144. Furthermore, the removal of the tape material 130 provides indentations 150 in the second layer 144 for simulating the indentations of grout of a decorative pattern of tile, natural stone, marble, granite, brick or any other suitable pattern.

Figure 21:
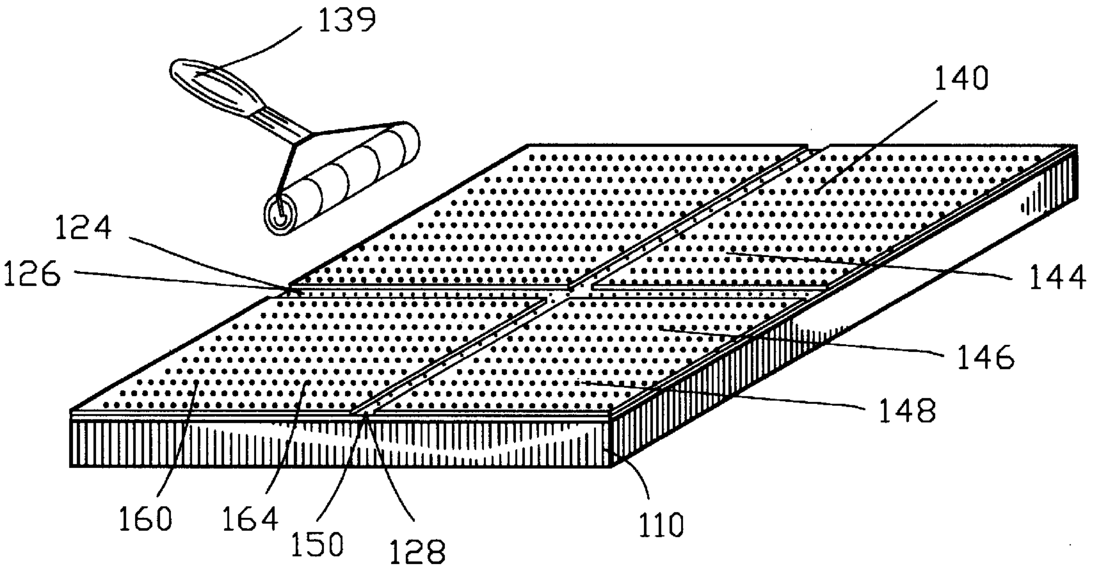
FIG. 21 is an isometric view illustrating the application of a third layer of a third curable polymeric material to the second layer.

FIG. 21 is an isometric view illustrating the application of a third curable polymeric material 160 to the second layer 144 to form a third layer 164 of the third curable polymeric material 160. One example of the third curable polymeric material 164 which is suitable for use with the present invention is a clear polymeric material such as a two part urethane polymeric material.

In this embodiment, the third curable polymeric material 160 is shown being rolled onto the exposed first layer 124 and the second layer 144 through the use of a conventional paint roller 139. The third layer 164 of the third curable polymeric material 60 acts as a sealer for the decorative resilient floor covering of the present invention.

In this second embodiment of the invention, the first pigmented particulate material 126 may be mixed with the first curable polymeric material 120 thus eliminating any excessive first pigmented particulate material 126 from the first layer 124. In a similar manner, the second pigmented particulate material 146 may be mixed with the second curable polymeric material 120 thus eliminating any excessive second pigmented particulate material 146 from the second layer 144. The first second and third layers 124, 144 and 164 may be established in thicknesses as set forth above.

In still another embodiment of the present invention, only a single pigmented particulate material may be added to only one of the first and second layers 24 and 44. In one example of this embodiment, the single pigmented particulate material is added to only the second layer 44 to contrast the natural color of the first curable polymeric material 20 of the first layer 24. In addition, a pigment may be incorporated into the first curable polymeric material 20 for changing the color thereof.

The present invention provides a process of making a decorative resilient floor covering having the appearance of a tile, natural stone, marble, granite, brick or the like with multiple colors of grout. The present invention provides the advantages of tile, natural stone, marble, granite, brick or the like while being resilient and comfortable for walking on for prolonged periods of time. The decorative resilient floor covering may be installed by a semi-skilled worker through the use of a conventional paint roller.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A process of making a decorative resilient floor covering comprising the steps of:

applying a first layer of a first curable resilient polymeric material to a substrate with the resilient polymeric material consisting of a two-part water activated polyurethane;

spraying a first pigmented particulate material in the form of paint chips upwardly to fall by action of gravity onto the first layer of the first curable polymeric material prior to the curing thereof with the first pigmented particulate material having a first color;

applying a tape material in a decorative pattern to selected regions of the first layer of the first curable polymeric material after the curing thereof;

applying a second layer of a second curable polymeric material to the cured first layer;

spraying a second pigmented particulate material in the form of paint chips upwardly to fall by action of gravity onto the second layer of the second curable polymeric material prior to the curing thereof with the second pigmented particulate material having a second color different than the first color of the first pigmented particulate material;

removing the tape material to reveal the first color of the first layer and the second color of the second layer; and applying a third layer of a third curable polymeric material to the cured second layer and exposed cured first layer.

2. A process of making a decorative resilient floor covering as set forth in claim 1, wherein the substrate is a substantially rigid substrate.

3. A process of making a decorative resilient floor covering as set forth in claim 1, wherein the substrate is a semi-rigid substrate.

4. A process of making a decorative resilient floor covering as set forth in claim 1, including the step of preparing the substrate for adherence by the first curable polymeric material.

5. A process of making a decorative resilient floor covering as set forth in claim 1, wherein the step of applying the first layer of the first curable polymeric material to the substrate includes troweling the first curable polymeric material onto the substrate.

6. A process of making a decorative resilient floor covering as set forth in claim 1, wherein the step of applying the first layer of the first curable polymeric material to the substrate includes applying the first layer of the first curable polymeric material on to the substrate to a thickness between 0.010 and 0.020 inches.

7. A process of making a decorative resilient floor covering as set forth in claim 1, wherein the first pigmented particulate material comprises paint chips in the configuration of flakes having a longitudinal and transverse dimension of 0.05 to 0.25 inches and having a thickness between 0.003 to 0.007 inches.

8. A process of making a decorative resilient floor covering as set forth in claim 1, wherein the step of applying the second layer of the second curable polymeric material to the cured first layer includes rolling the second curable polymeric material onto the first layer by a roller.

9. A process of making a decorative resilient floor covering as set forth in claim 1, wherein the step of applying the second layer of the second curable polymeric material to the first layer includes spraying the second layer of the second curable polymeric material onto the first layer to have a thickness between 0.005 and 0.010 inches.

10. A process of making a decorative resilient floor covering as set forth in claim 1, wherein the second pigmented particulate material comprises paint chips having a longitudinal and transverse dimension of 0.05 to 0.25 inches and having a thickness between 0.003 to 0.007 inches.

11. A process of making a decorative resilient floor covering as set forth in claim 1, wherein the step of applying a third layer of a third curable polymeric material to the cured second layer and exposed cured first layer includes rolling the third curable polymeric material onto the cured second layer and exposed cured first layer.

12. A process of making a decorative resilient floor covering as set forth in claim 1, wherein the step of applying a third layer of a third curable polymeric material to the cured second layer and exposed cured first layer to have a thickness between 0.005 and 0.010 inches.

13. A process of making a decorative resilient floor covering comprising the steps of:

applying a first layer of a first curable resilient polymeric material to a substrate with the resilient polymeric material consisting of a two-part water activated polyurethane to a thickness between 0.010 and 0.020 inches;

spraying a first pigmented particulate material in the form of first paint chips upwardly to fall by action of gravity onto the first layer of the first curable polymeric material prior to the curing thereof with the first pigmented particulate material having a first color;

applying a tape material in a decorative pattern to selected regions of the first layer of the first curable polymeric material after the curing thereof;

rolling a second layer of a second curable polymeric material to the cured first layer to have a thickness between 0.005 and 0.010 inches;

spraying a second pigmented particulate material in the form of second paint chips upwardly to fall by action of gravity onto the second layer of the second curable polymeric material prior to the curing thereof with the second pigmented particulate material having a second color different than the first color of the first pigmented particulate material;

removing the tape material to reveal the first color of the first layer and the second color of the second layer; and rolling a third layer of a third curable polymeric material to the cured second layer and exposed cured first layer to have a thickness between 0.005 and 0.010 inches.

* * * * *